United States Patent
Prats et al.

(10) Patent No.: US 9,491,609 B2
(45) Date of Patent: *Nov. 8, 2016

(54) IMMEDIATE CONNECTION FOLLOWING DEVICE DISCOVERY

(71) Applicant: Apple Inc., Cupertino, CA (US)

(72) Inventors: Augustin Prats, Cupertino, CA (US); Joakim Linde, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,575

(22) Filed: Oct. 5, 2015

(65) Prior Publication Data

US 2016/0029198 A1 Jan. 28, 2016

Related U.S. Application Data

(63) Continuation of application No. 14/542,161, filed on Nov. 14, 2014, now Pat. No. 9,154,936, which is a continuation of application No. 13/627,913, filed on Sep. 26, 2012, now Pat. No. 8,892,042.

(60) Provisional application No. 61/657,363, filed on Jun. 8, 2012.

(51) Int. Cl.
*H04W 8/00* (2009.01)
*H04W 76/02* (2009.01)
(Continued)

(52) U.S. Cl.
CPC ............. *H04W 8/005* (2013.01); *H04W 4/008* (2013.01); *H04W 76/02* (2013.01); *H04W 76/023* (2013.01); *H04W 84/20* (2013.01); *Y02B 60/50* (2013.01)

(58) Field of Classification Search
CPC ........... H04W 76/023; H04W 8/0005; H04W 84/20; H04W 4/008; Y02B 60/50
See application file for complete search history.

(56) References Cited

U.S. PATENT DOCUMENTS 7,173,941 B2 2/2007 Diaz
7,277,453 B2 10/2007 Chin et al.
(Continued)

FOREIGN PATENT DOCUMENTS

EP 1392023 2/2004
JP 2009-049590 A 3/2009
JP 2010-535460 A 11/2010

OTHER PUBLICATIONS

Office Action with English Language translation directed to related Japanese Patent Application No. JP 2015-516060, dated Dec. 27, 2015; 6 pages.
(Continued)

*Primary Examiner* — Lewis West
(74) *Attorney, Agent, or Firm* — Sterne, Kessler, Goldstein & Fox P.L.L.C

(57) ABSTRACT

An electronic device is described. During operation, this electronic device activates a communication channel having a carrier frequency in a radio in an interface circuit to listen for an advertising frame of interest from another electronic device during a scan window having a predefined duration. If the advertising frame of interest is received from the other electronic device, the electronic device terminates the listening before the predefined duration has expired and, using the communication channel in the radio, transmits the connect request to the other electronic device to establish the connection with the other electronic device. In this way, the delay between discovery of the other electronic device and establishing the connection is reduced. In addition, the power consumed by the electronic device while scanning for the other electronic device and initiating the connection is reduced.

20 Claims, 10 Drawing Sheets

(51) Int. Cl.
*H04W 4/00* (2009.01)
*H04W 84/20* (2009.01)

(56) References Cited

U.S. PATENT DOCUMENTS

| | | |
|---|---|---|
| 7,343,395 B2 | 3/2008 | Olsen et al. |
| 7,483,393 B2 | 1/2009 | Wing |
| 7,535,884 B2 | 5/2009 | Stephenson et al. |
| 8,107,484 B2 | 1/2012 | Xu |
| 8,266,257 B1 | 9/2012 | Shavell et al. |
| 8,437,384 B2 | 5/2013 | Maguire |
| 8,873,536 B2 | 10/2014 | Conn et al. |
| 8,892,042 B2 | 11/2014 | Prats et al. |
| 8,942,221 B2 | 1/2015 | McCann et al. |
| 9,001,695 B2 | 4/2015 | Prats et al. |
| 9,060,329 B2 | 6/2015 | Montemurro |
| 9,154,936 B2 | 10/2015 | Prats et al. |
| 9,204,469 B2 | 12/2015 | Prats et al. |
| 2003/0161342 A1 | 8/2003 | Diaz |
| 2003/0187931 A1 | 10/2003 | Olsen et al. |
| 2006/0120293 A1 | 6/2006 | Wing |
| 2008/0287145 A1 | 11/2008 | Harris |
| 2009/0034591 A1 | 2/2009 | Julian et al. |
| 2009/0045970 A1 | 2/2009 | Miyabayashi et al. |
| 2009/0138705 A1 | 5/2009 | Stach |
| 2009/0257439 A1 | 10/2009 | Xu |
| 2011/0021142 A1 | 1/2011 | Desai et al. |
| 2012/0052802 A1 | 3/2012 | Kasslin et al. |
| 2012/0307875 A1 | 12/2012 | Maguire |
| 2013/0109315 A1 | 5/2013 | Polo et al. |
| 2013/0121325 A1 | 5/2013 | McCann et al. |
| 2013/0329613 A1 | 12/2013 | Conn et al. |
| 2013/0331076 A1 | 12/2013 | Prats et al. |
| 2013/0331141 A1 | 12/2013 | Montemurro |

OTHER PUBLICATIONS

Office Action with English Language translation directed to related German Patent Application No. DE 11 2013 002 821.2, dated May 12, 2016; 14 pages.

"Specification of the Bluetooth System, Specification vol. 6", Jun. 30, 2010.

International Preliminary Report on Patentability directed to related International Patent Application No. PCT/US2013/042899, issued Dec. 9, 2014; 10 pages.

International Search Report and Written Opinion of the International Searching Authority directed to related International Patent Application No. PCT/US2013/042899, mailed Apr. 10, 2014; 13 pages.

# IMMEDIATE CONNECTION FOLLOWING DEVICE DISCOVERY

CROSS REFERENCE TO RELATED APPLICATIONS

The instant application is a continuation of, and hereby claims priority to, pending U.S. patent application Ser. No. 14/542,161, which was filed on 14 Nov. 2014. The instant application also claims priority to U.S. patent application Ser. No. 13/627,913, which was filed on 26 Sep. 2012, which issued as U.S. Pat. No. 8,892,042 on 18 Nov. 2014, and of which parent U.S. application Ser. No. 14/542,161 is a continuation. The instant application additionally claims priority to U.S. provisional patent application No. 61/657,363, which was filed on 8 Jun. 2012, and to which parent U.S. application Ser. No. 14/542,161 and grandparent U.S. application Ser. No. 13/627,913 claim priority. Each of these applications is incorporated by reference.

This application is related to U.S. Patent Application Ser. No. 61/657,458, entitled "Duplicate Connection Detection for Devices Using Random Addresses," by Augustin Prats and Joakim Linde, filed Jun. 8, 2012; U.S. Patent Application Ser. No. 61/657,401, entitled "Caching of a Remote Data Structure Based on Requested Information," by Augustin Prats, Jason C. Conn, Joakim Linde, and Brian J. Tucker, filed Jun. 8, 2012; and U.S. Patent Application Ser. No. 61/657,393, entitled "Identifying a Random Advertising Device as a Connected Device," by Jason C. Conn, and Augustin Prats, filed Jun. 8, 2012, the contents of all of which are herein incorporated by reference.

BACKGROUND

Field

The described embodiments relate to techniques for communicating information between electronic devices.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) standards 802.11 or Bluetooth™ from the Bluetooth Special Interests Group of Kirkland, Wash.), and/or another type of wireless interface. In some of these electronic devices, the network interfaces can be used to detect other electronic devices as part of a process for enabling communication between the electronic devices. For example, one electronic device can broadcast an advertising frame which includes encoded information that indicates a network address of the electronic device, and another electronic device can monitor for the advertising frame to detect the electronic device. Once the other electronic device detects or discovers the electronic device, a connection protocol may be followed to establish a connection between them.

However, there is typically a significant delay between discovery of the electronic device and establishing the connection. For example, monitoring for the advertising frame by the other electronic device usually occurs during a scan window in a scanning operating mode. Even if the advertising frame is received, the other electronic device may continue monitoring for additional advertising frames for a predefined duration of the scanning operating mode or state. Then, the other electronic device may transition to an initiating (connecting) operating mode or state, and may establish the connection. In addition to increasing the time needed to establish the connection, this delay can also increase power consumption, which is a problem in portable electronic devices, such as battery-powered portable electronic devices.

SUMMARY

The described embodiments include an electronic device. This electronic device includes: an antenna; an interface circuit, coupled to the antenna, that communicates with other electronic devices; and control logic coupled to the interface circuit. This control logic activates a communication channel having a carrier frequency in a radio in the interface circuit to listen for an advertising frame of interest from another electronic device during a scan window having a predefined duration. If the advertising frame of interest is received from the other electronic device, the control logic terminates the listening before the predefined duration has expired and, using the communication channel in the radio, transmits a connect request to the other electronic device to establish a connection with the other electronic device.

Note that the advertising frame may be of interest when a connection has previously been established with the other electronic device.

In some embodiments, the advertising frame includes an encoded address, and the control logic determines an actual address of the other electronic device.

Moreover, the communication between the electronic device and the other electronic device may use Bluetooth™. Furthermore, the connect request may be transmitted without waiting for an initiation state of the electronic device.

Another embodiment provides an integrated circuit that includes the interface circuit and the control logic.

Another embodiment provides a method for communicating between electronic devices, which may be performed by the integrated circuit. During operation, the integrated circuit activates the communication channel having the carrier frequency in the radio in the interface circuit to listen for the advertising frame of interest from the other electronic device during the scan window having the predefined duration. If the advertising frame of interest is received from the other electronic device, the integrated circuit terminates the listening before the predefined duration has expired and, using the communication channel in the radio, transmits the connect request to the other electronic device to establish the connection with the other electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
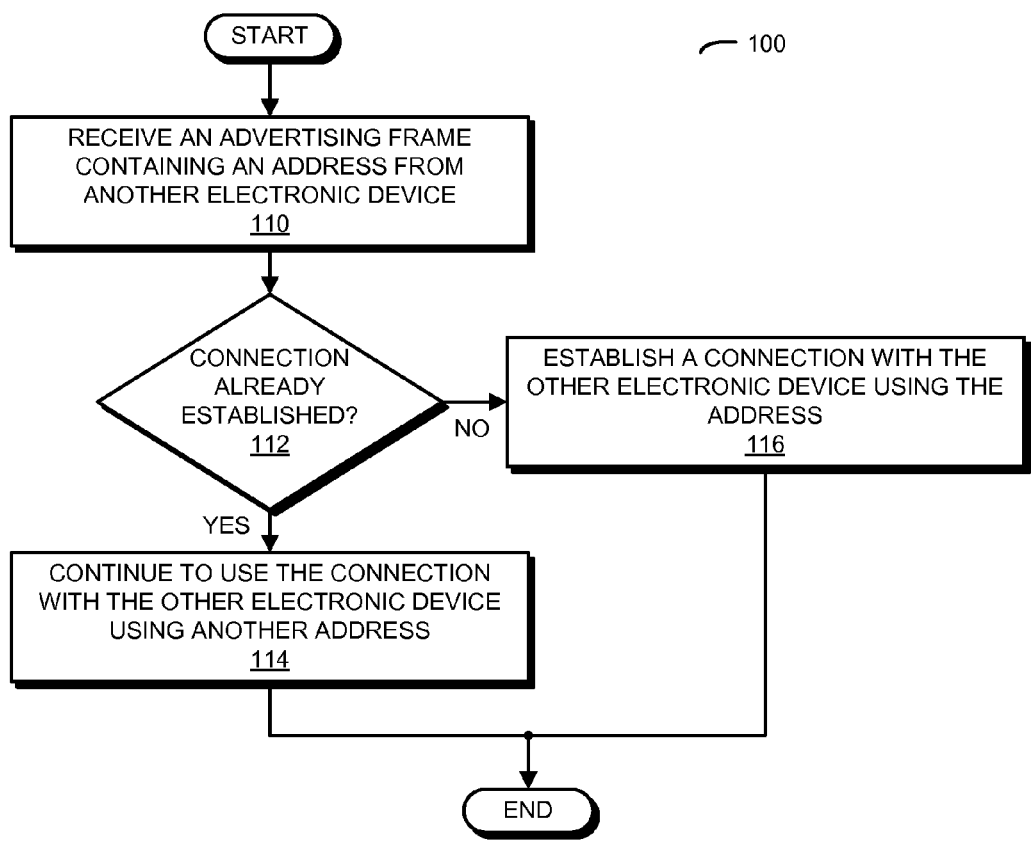
FIG. 1 is a flow diagram illustrating a method for communicating between electronic devices in accordance with an embodiment of the present disclosure.
Figure 9:
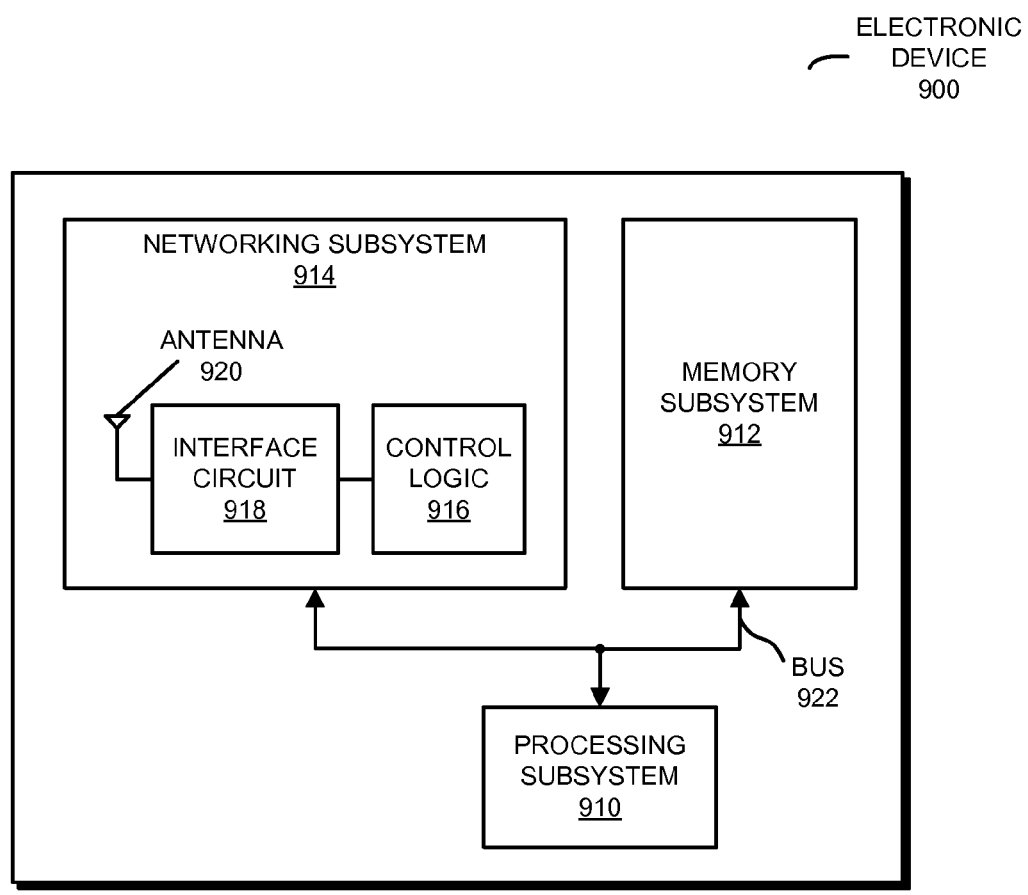
FIG. 9 is a block diagram illustrating an electronic device in accordance with an embodiment of the present disclosure.

FIG. 1 presents a flow diagram illustrating a method 100 for communicating between electronic devices, which may be performed by electronic device 900 (FIG. 9) or integrated circuit 1000 (FIG. 10) (which may be included in electronic device 900 in FIG. 9). During operation, the integrated circuit receives an advertising frame containing an address (such as address P2) from another electronic device (operation 110). For example, the advertising frame may include a header with a randomly generated (or pseudo-randomly generated) address (or network address) for the other electronic device. Using the Bluetooth™ communication protocol as an illustration, the other electronic device may be peripheral and the electronic device (or the integrated circuit) that receives the advertising frame while scanning may be central. Moreover, the address may be generated by combining a portion of the Media Access Control (MAC) address of the other electronic device with a random number (i.e., a random number and a signature). In some embodiments, three bytes of the MAC address of the other electronic device are run through a hash function and combined with a random number. This combination may be encrypted, for example, using a 128-bit Advanced Encryption Standard (AES) encryption technique.

In order to offer privacy when advertising, the address included in the advertising frames that are transmitted by the other electronic device may be periodically changed (for example, every 15 minutes). However, if a connection was already established between the other electronic device and the electronic device (or the integrated circuit), then when the advertising frame is received in operation 110, it may (erroneously) result in the other electronic device being detected or discovered as a new electronic device in the network. As a consequence, the electronic device (or the integrated circuit) may subsequently transmit a connect request and establish an (unnecessary) duplicate connection with the other electronic device.

To prevent this problem from occurring, the integrated circuit determines if a connection has already been established (operation 112) with the other electronic device using another address, such as a previous version of the address (for example, other address P1) that was generated with the aforementioned technique (and which may be different from the address P2). In particular, the integrated circuit may determine the MAC addresses corresponding to the other address P1 and to the address P2 to determine if they are the same. If so, instead of establishing another connection with the other electronic device using the address, the integrated circuit continues to use the connection with the other electronic device using the other address (operation 114).

For example, if an application executing in an environment on the electronic device tries to establish a connection with the other electronic device based on the 'discovered' address P2, the integrated circuit may indicate to the application that a connection has already been established with the same electronic device at the other address P1. To facilitate this, the integrated circuit may store information (such as a pointer) in a memory that relates the address P2 and the other address P1. In this way, two physical links to the same peripheral may be prevented, thereby reducing power consumption and conserving limited network resources.

However, if a connection has not already been established with the other electronic device using another address (operation 112), the integrated circuit may establish a connection with the other electronic device using the address (operation 116). Thus, if the MAC addresses corresponding to the other address P1 and to the address P2 are different, or there is currently no connection between the electronic device and the other electronic device, a new connection may be established.

Figure 2:
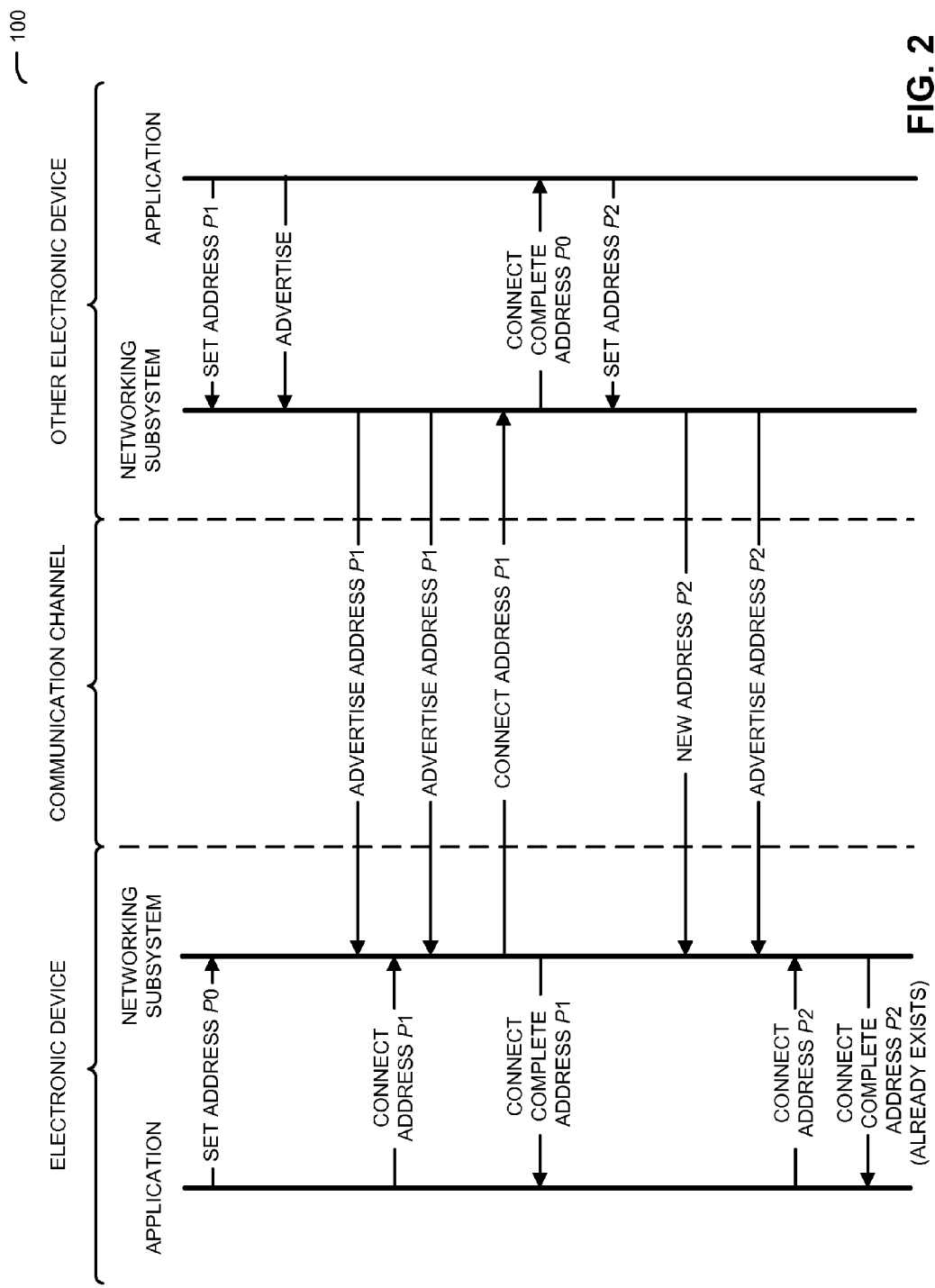
FIG. 2 is a flow diagram illustrating a method for communicating between electronic devices in accordance with an embodiment of the present disclosure.

The operations in method 100 are further illustrated in FIG. 2. In this figure, time progresses from top to bottom.

In an alternative approach for dealing with the problem of duplicate connections, the integrated circuit in the electronic device makes it appear as if the address P2 was never detected or discovered. In particular, when the other electronic device changes from the other address P1 to the address P2, it first communicates this information (for example, in a payload of a packet) to the electronic device (or the integrated circuit) using the other address P1 in the header of the packet. After receiving this packet, the integrated circuit stores the relationship between the other address P1 and the address P2 (for example, in a memory).

Subsequently, when frames or packets are received from the other electronic device with headers that include the address P2, the integrated circuit modifies these frames or packets, replacing the address P2 with the address P1, so that it appears that the frames or packets came from the other electronic device having the other address P1. In this way, the application executing in the environment of the electronic device may never know that the other electronic device was detected or discovered in the network at the address P2. This approach can prevent confusion on the part of a user of the application. Note that the modification of the packets may continue until the connection between the electronic device and the other electronic device is broken or reset.

Figure 3:
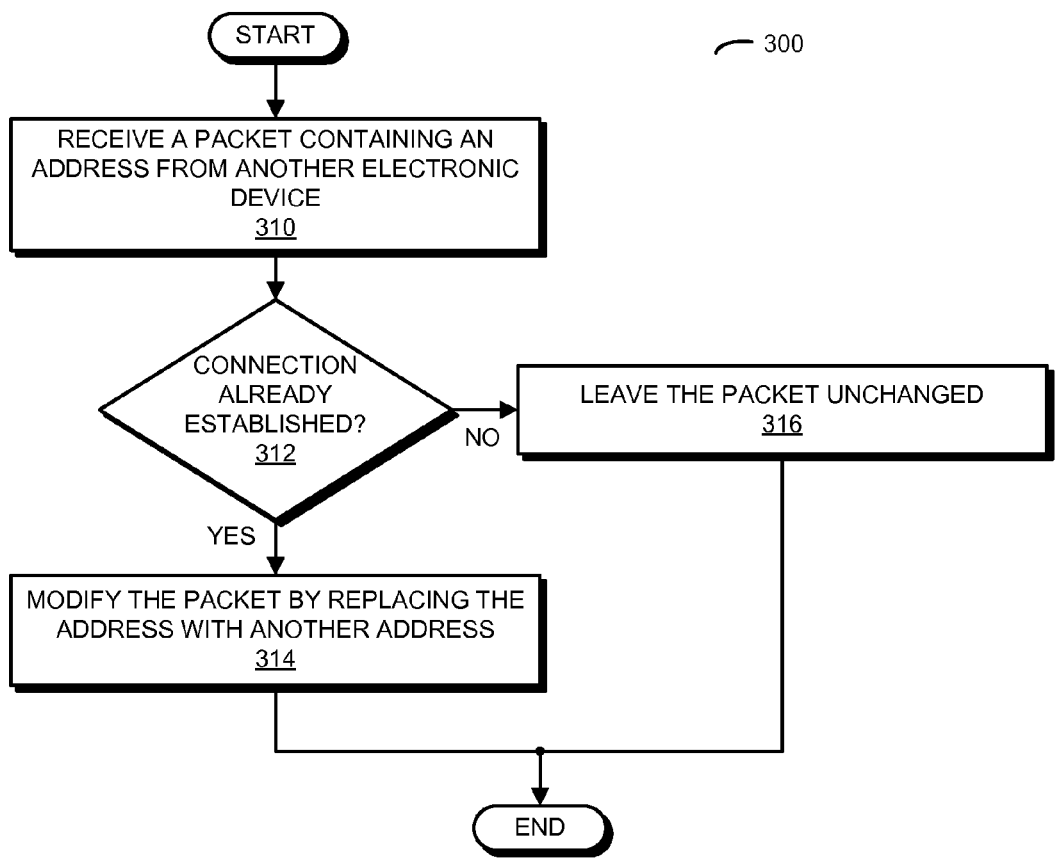
FIG. 3 is a flow diagram illustrating a method for communicating between electronic devices in accordance with an embodiment of the present disclosure.

This technique is shown in FIG. 3, which presents a flow diagram illustrating a method 300 for communicating between electronic devices, which may be performed by electronic device 900 (FIG. 9) or integrated circuit 1000 (FIG. 10) (which may be included in electronic device 900 in FIG. 9). During operation, the integrated circuit receives the packet (such as an advertising frame) containing the address (such as the address P2) from the other electronic device (operation 310). Then, the integrated circuit determines if a connection has already been established (operation 312) with the other electronic device using the other address, such as the other address P1. If so, the integrated circuit modifies the packet by replacing the address with the other address (operation 314) so that it appears as if the packet was received via the connection with the other electronic device using the other address. Otherwise, the integrated circuit leaves the packet unchanged (operation 316).

Figure 4:
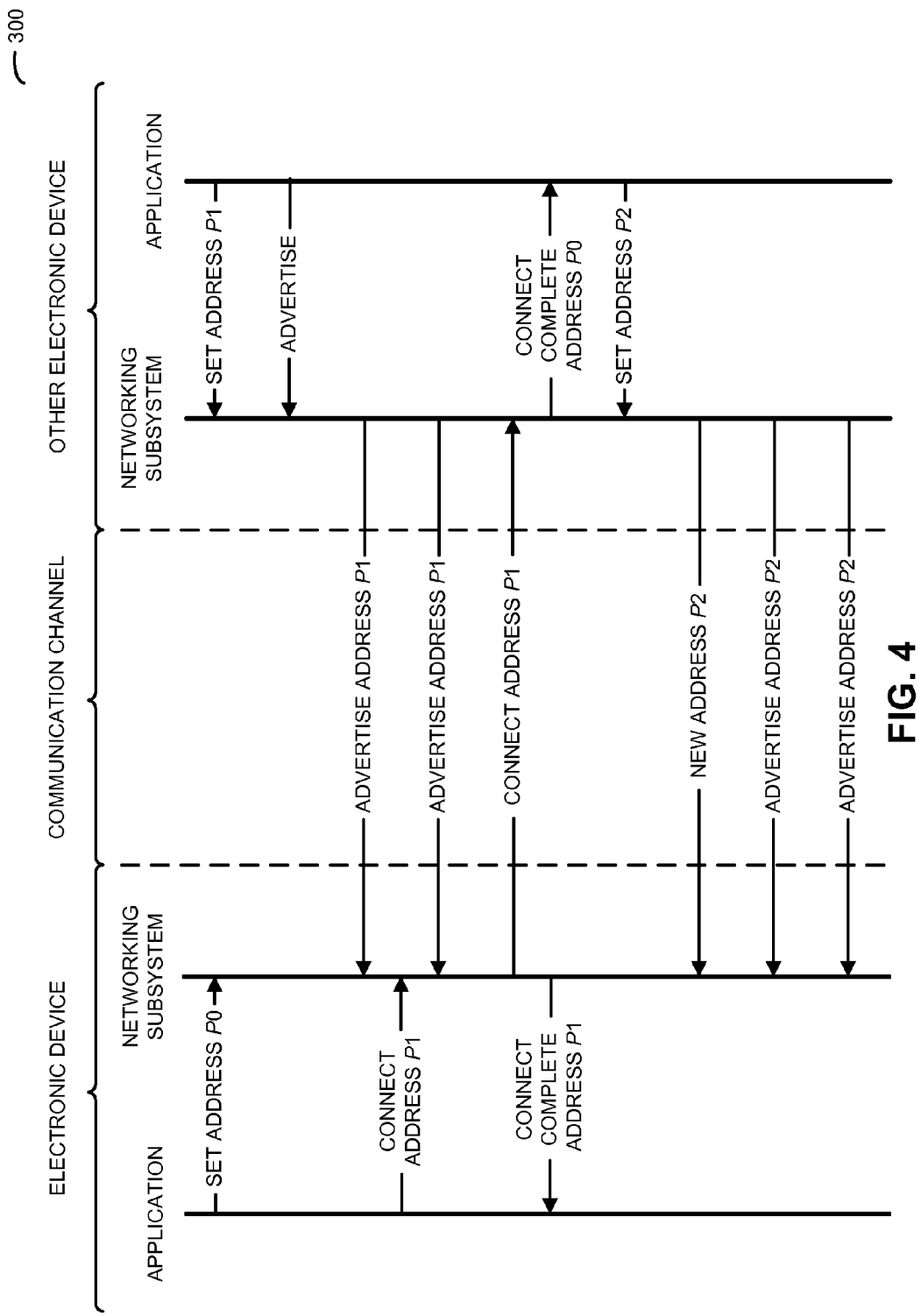
FIG. 4 is a flow diagram illustrating a method for communicating between electronic devices in accordance with an embodiment of the present disclosure.

The operations in method 300 are further illustrated in FIG. 4. In this figure, time progresses from top to bottom. Note that, when advertising frames with address P2 are received by the networking subsystem, the application in an upper software stack takes no action (i.e., does not instruct the networking subsystem to establish a connection with the other electronic device at address P2) because the networking subsystem modifies these advertising frames and replaces address P2 with address P1.

In existing Bluetooth™ network interfaces, the electronic device (or the integrated circuit) may have two distinct operating modes or states. During a scanning state, the electronic device listens for advertising frames from other (unknown) electronic devices in a network (such as the other electronic device). In particular, during a scan interval, there are scan windows when the electronic device listens for advertising frames. If an advertising frame is received, at other times during the scan interval the electronic device may transmit a scan request to request more information from the other electronic device.

Furthermore, in existing Bluetooth™ network interfaces, after a predefined duration of the scan interval (such as 110-120 ms), there is a separate initiating state, during which the electronic device can establish a connection with a previously discovered electronic device, such as the other electronic device. For example, during the initiating state, the electronic device may listen for advertising frames. If another advertising frame from the other electronic device is received (in addition to the advertising frame received during the scanning state), the electronic device may transmit a connect request to the other electronic device.

However, because the scanning state typically has the predefined duration, there is often a significant delay between when the other electronic device is discovered and when the connection is subsequently established. Moreover, because the interface circuit is active throughout the scan time, the electronic device may also needlessly consume additional power.

Both of these problems can be addressed by merging the scanning state and the initiating state into a common operating mode or state. In particular, when the electronic device receives an advertising frame from the other electronic device when scanning or listening, the electronic device may immediately determine if the discovered other electronic device is of interest (for example, if the electronic device has previously received an advertising frame from the other electronic device or has previously been connected to the other electronic device). If yes, without waiting for expiration of the predefined scan interval or for the initiation state of the electronic device, the electronic device may transmit a connect request to establish a connection with the other electronic device. In this way, the time to connect may be reduced by more than a factor of two, with a commensurate reduction in power consumption.

Figure 5:
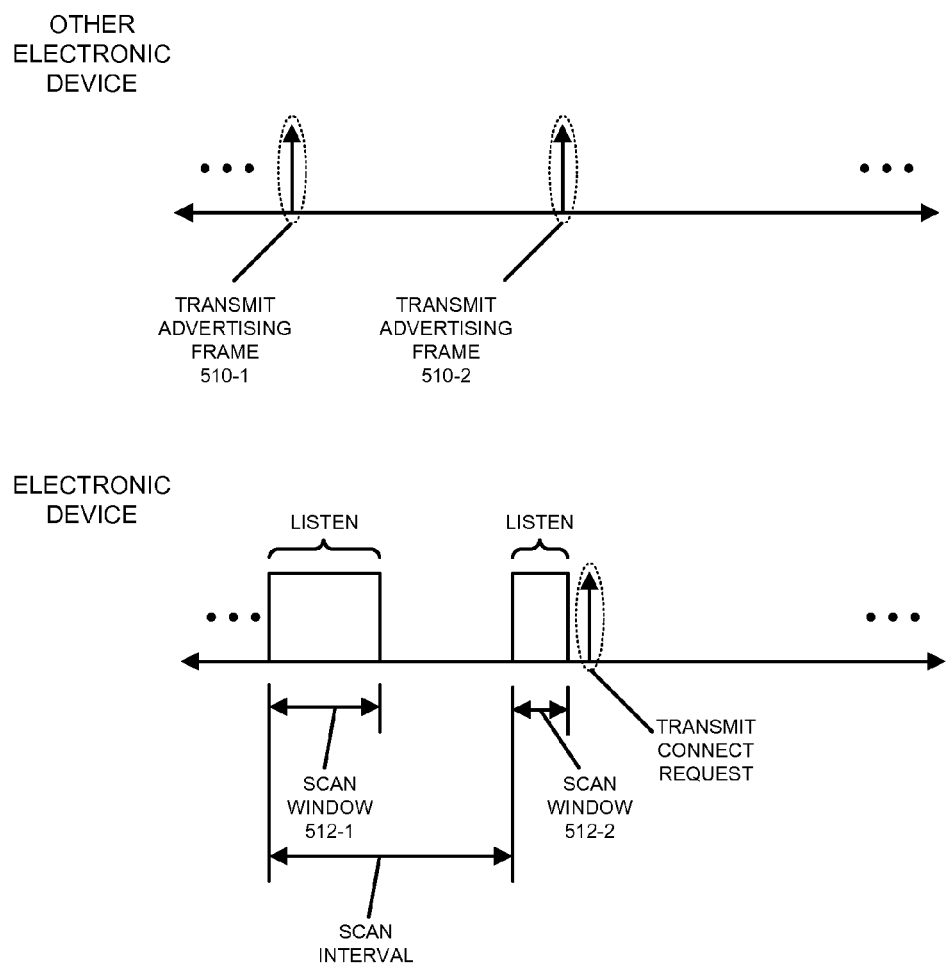
FIG. 5 is a timeline diagram illustrating scanning and initiation for two electronic devices in accordance with the described embodiments.

This communication technique is shown in FIG. 5, which presents a timeline 500 illustrating scanning and initiation for two electronic devices. When the electronic device receives advertising frame 510-2 transmitted by the other electronic device, it determines that this is an advertising frame of interest based on the earlier receipt of advertising frame 510-1 transmitted by the other electronic device. As a consequence, the electronic device switches its radio from receive to transmit, and transmits a connect request. Therefore, scan window 512-2 is reduced in duration, as opposed to the normal predefined duration illustrated for scan window 512-1.

Figure 6:
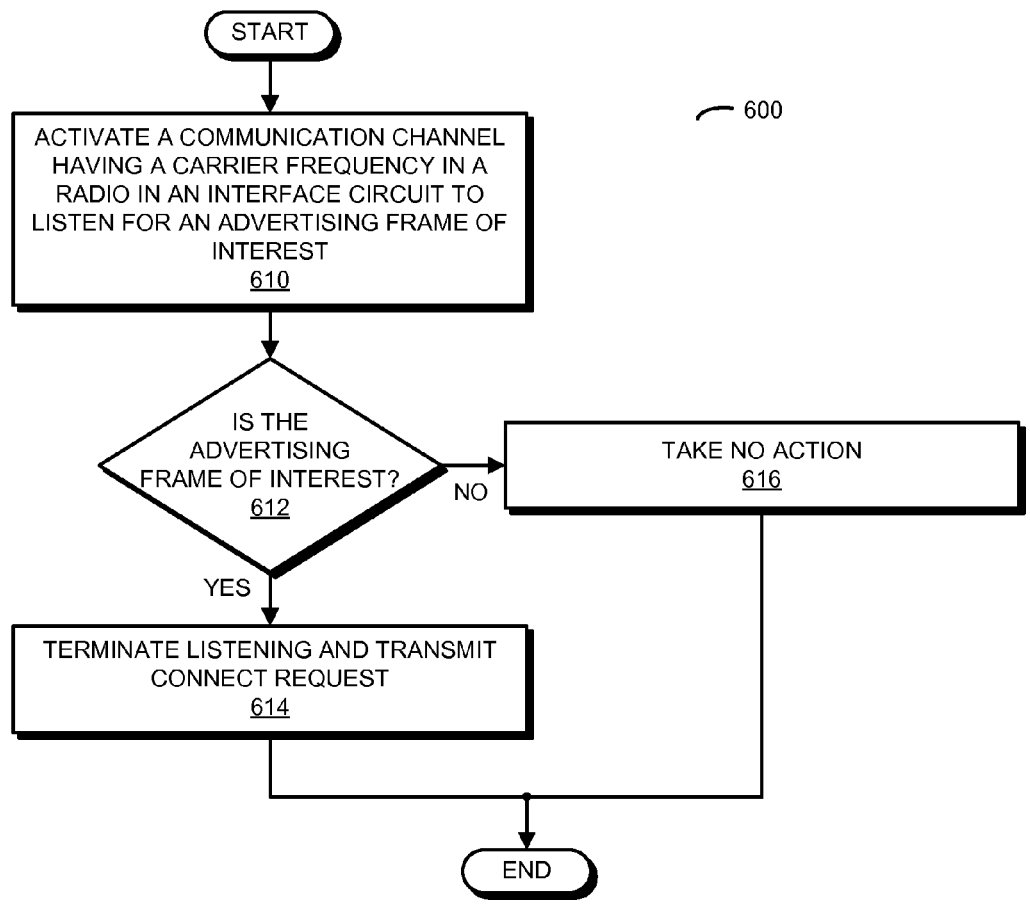
FIG. 6 is a flow diagram illustrating a method for communicating between electronic devices in accordance with an embodiment of the present disclosure.

In addition, the communication technique is shown in FIG. 6, which presents a flow diagram illustrating a method 600 for communicating between electronic devices. Note that method 600 may be performed by electronic device 900 (FIG. 9) or integrated circuit 1000 (FIG. 10) (which may be included in electronic device 900 in FIG. 9).

During operation, the integrated circuit activates a communication channel having a carrier frequency in a radio in the interface circuit to listen for the advertising frame of interest (operation 610) from the other electronic device during the scan window having the predefined duration. If the advertising frame of interest is received from the other electronic device (operation 612), the integrated circuit terminates the listening (operation 614) before the predefined duration has expired and, using the communication channel in the radio, transmits the connect request (operation 614) to the other electronic device to establish the connection with the other electronic device. Otherwise, the integrated circuit takes no action (operation 616) so that the scanning continues until the predefined duration has expired.

In some embodiments, the advertising frame received in operation 612 includes an encoded address (such as the randomly generated address discussed previously with reference to FIG. 1). If the electronic device and the other electronic device were previously paired (i.e., if the electronic device and the other electronic device were previously connected), the electronic device may have information specifying the hash function and/or the random number generator, which may be used to determine an actual address of the other electronic device (such as the MAC address). This actual (physical) address may allow the electronic device to determine if the advertising frame (and, thus, the other electronic device) is of interest.

After the connection is established, the electronic device may attempt to access services supported by the other electronic device, as well as associated data. However, before the electronic device can access this information, it typically must obtain the information specifying the services supported by the other electronic device and the details of how this data is arranged or stored in the other electronic device (which is sometimes referred to as a 'remote data structure'). This information is often obtained by transmitting a set of request messages from the electronic device to the other electronic device, and receiving a corresponding set of response messages from the other electronic device to the electronic device. Typically, the sequence of request and response messages can take more than a second to communicate. This delay can be frustrating to a user of the electronic device, may degrade the user experience, and may increase power consumption.

These problems can be addressed by caching the remote data structure. However, the representation of the remote data structure may be incomplete, and obtaining all of this information may be unduly time-consuming.

In a more efficient and tractable approach (which is sometimes referred to as an 'attribute protocol'), the electronic device may cache the results of discovery queries or requests, as well as the type and parameters of the discovery request. In this way, the partial cache will indicate whether the discovery was complete or partial, and whether the desired information was obtained.

Figure 7:
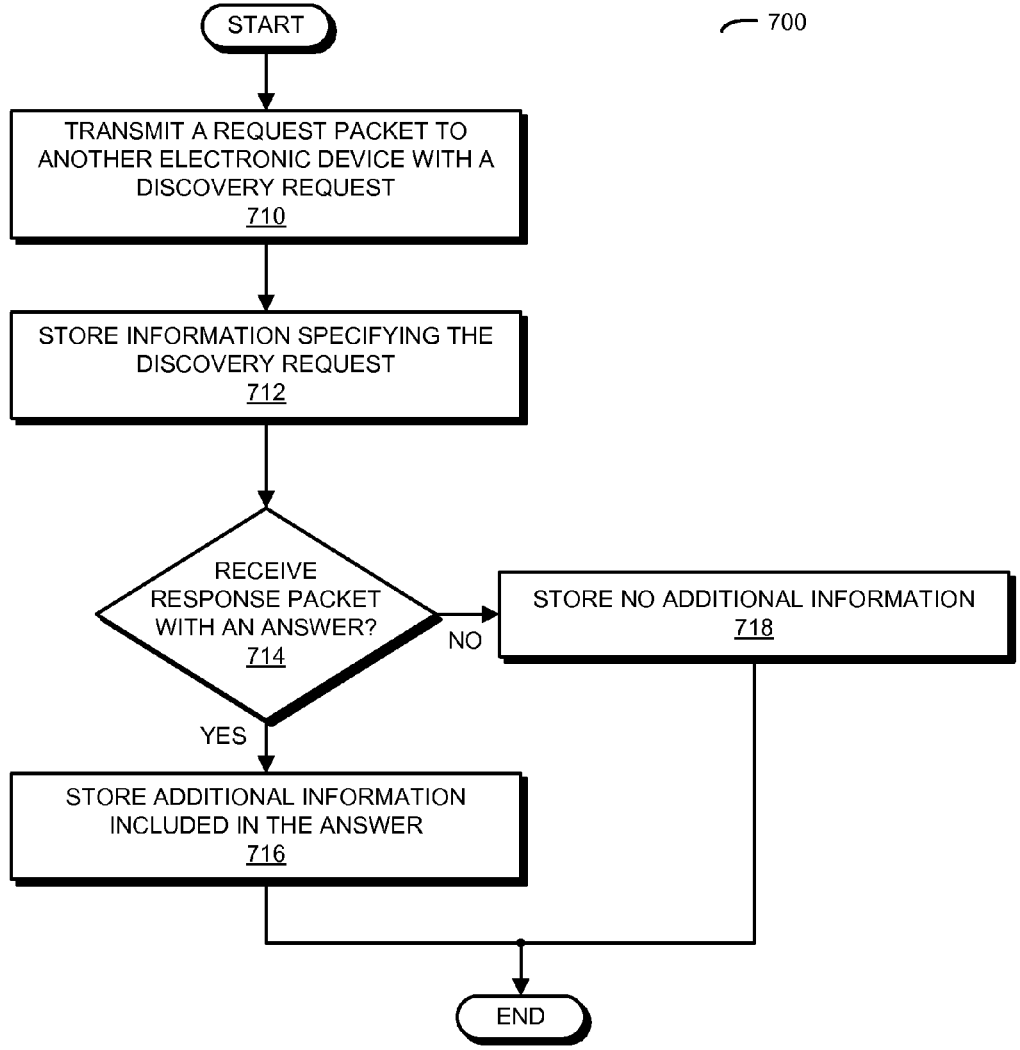
FIG. 7 is a flow diagram illustrating a method for communicating between electronic devices in accordance with an embodiment of the present disclosure.

This communication technique is shown in FIG. 7, which presents a flow diagram illustrating a method 700 for communicating between electronic devices, which may be performed by electronic device 900 (FIG. 9) or integrated circuit 1000 (FIG. 10) (which may be included in electronic device 900 in FIG. 9). During operation, the electronic device transmits a request packet to the other electronic device with a discovery request (operation 710). Moreover, the electronic device stores information specifying the discovery request (operation 712). If a response packet with an answer to the discovery request is received from the other electronic device (operation 714), the electronic device stores additional information included in the answer (operation 716), where the additional information specifies a position in an information hierarchy in the other electronic device and a data format associated with the position. Otherwise, no additional information is stored (operation 718).

Note that the position in the hierarchy may include a service, and the data format may include: a start position, an end position, and an identifier. Alternatively or additionally, the position in the hierarchy may include a characteristic associated with a service, and the data format may include: a start position, an end position, a permission, and an identifier. However, the stored information may exclude one or more data value(s) at the position in the hierarchy, such as character values.

By partially caching the information and the additional information, the electronic device may significantly reduce the number of request and response messages, and thus the delay and the power consumption, when the electronic device subsequently accesses data in the information hierarchy. In particular, while obtaining the stored additional information is time-consuming a first time there is a connection between the electronic device and the other electronic device, this discovery process (including the request messages and the response messages) may only need to be performed once. Subsequently, when a connection is established between the electronic device and the other electronic device, the electronic device already knows the details of the information hierarchy (i.e., the data structure) in the other electronic device, and can immediately request (within a couple of hundred milliseconds) desired information or data, such as a character value at a position in the data structure.

For example, the other electronic device may be an exercise monitor that stores a heart rate of a user. This exercise monitor may offer a set of services, such as service S1 (such as heart-rate monitor), service S2, and service S3. Each of these services may have a start position in the information hierarchy, such as a flat map (or, more generally, a data structure), an end position in the flat map, and an identifier. Moreover, service S1 may have associated characteristics, such as beats per minute C1, amplitude C2, and sensor location C3, and corresponding character values (or data).

If the electronic device transmits one or more discovery requests about services S1 and S4, a software module executing in the environment of the electronic device may store or cache these requests. Because service S4 does not exist, an answer may not be received. This information may also be stored by the software module. (Alternatively, the absence of additional stored information may indicate that an answer was not received.) The answer to the discovery request about service S1 may include start position 3 in the information hierarchy, end position 10 in the information hierarchy, and an identifier.

If the electronic device is subsequently connected to the other electronic device again, the stored information about service S1 is available so it does not need to be requested again.

In some embodiments, the services on the other electronic device include service S0. This service may include information indicating whether the data structure (or the information hierarchy) has changed and what was changed. Based on this information, the electronic device may remove some or all of the cached information for the remote data structure based on one or more caching preferences. Alternatively or additionally, the electronic device may remove some or all of the cached information for the remote data structure: if the connection is broken; if the address associated with the other electronic device cannot be reversed to the corresponding MAC address; and/or when the networking subsystem is powered off.

In some embodiments of the preceding methods, there may be additional or fewer operations. Moreover, the order of the operations may be changed, and/or two or more operations may be combined into a single operation.

Figure 8:
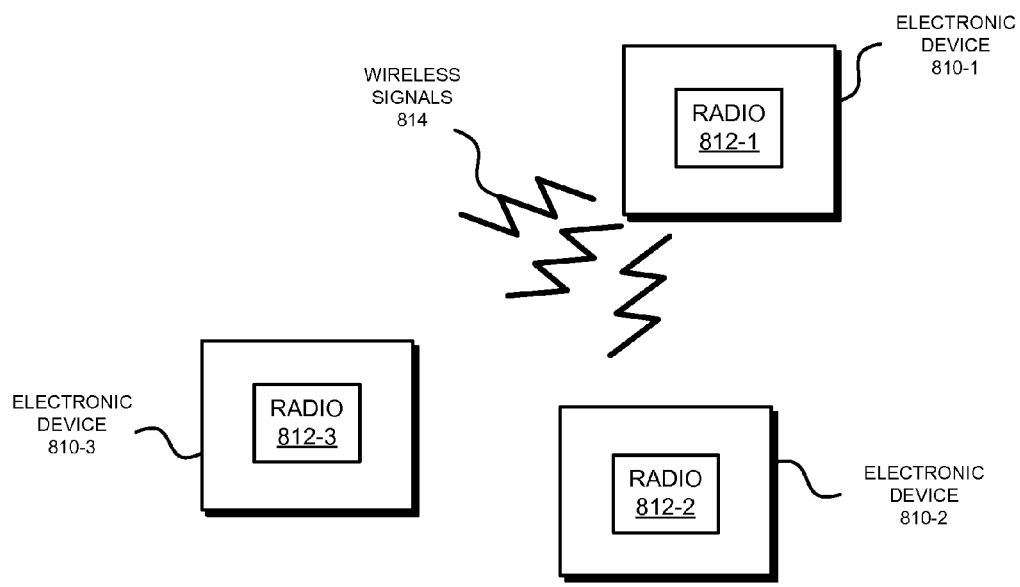
FIG. 8 is a block diagram illustrating a group of electronic devices wirelessly communicating in accordance with an embodiment of the present disclosure.

We now describe embodiments of the electronic device and a system that includes multiple electronic devices. FIG. 8 presents a block diagram illustrating a group of electronic devices 810 wirelessly communicating. In particular, these electronic devices may wirelessly communicate while: discovering one another by scanning wireless channels, transmitting advertising frames on wireless channels, establishing connections by transmitting connect requests, and/or partially caching remote data structures.

Figure 10:
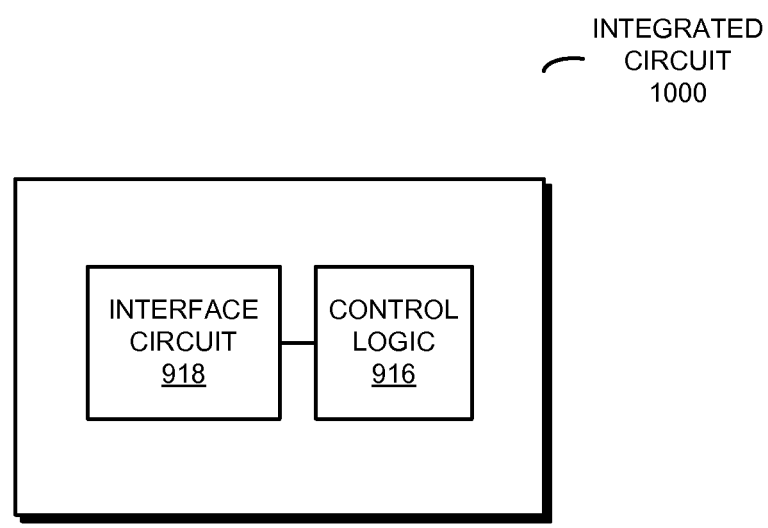
FIG. 10 is a block diagram illustrating an integrated circuit in accordance with an embodiment of the present disclosure.

As described further below with reference to FIGS. 9 and 10, each of electronic devices 810 may include subsystems, such as a networking subsystem, a memory subsystem and a processor subsystem. In addition, electronic devices 810 may include radios 812 in the networking subsystems. More generally, electronic devices 810 can include (or can be included within) any electronic devices with the networking subsystems that enable electronic devices 810 to wirelessly communicate with another electronic device. This can comprise transmitting advertising frames on wireless channels to enable electronic devices to make initial contact, followed by exchanging subsequent data/management frames (such as connect requests) to establish a connection, configure security options (e.g., IPSEC), etc.

As can be seen in FIG. 8, wireless signals 814 (represented by jagged lines) are transmitted from a radio 812-1 in electronic device 810-1. These wireless signals 814 are received by radios 812-2 and 812-3 in electronic devices 810-2 and 810-3, respectively.

In the described embodiments, processing an advertising frame in either of electronic devices 810-2 and 810-3 includes: receiving wireless signals 814 with the advertising frame; decoding/extracting the advertising frame from received wireless signals 814 to acquire the advertising frame; and processing the advertising frame to determine information contained in the advertising frame (such as the address in the header).

Although we describe the network environment shown in FIG. 8 as an example, in alternative embodiments, different numbers or types of electronic devices may be present. For example, some embodiments comprise more or fewer electronic devices. As another example, in another embodiment, different electronic devices are transmitting and/or receiving frames.

FIG. 9 presents a block diagram illustrating an electronic device 900. This electronic device includes processing subsystem 910, memory subsystem 912, and networking subsystem 914.

Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions, which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured, to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and an antenna 920. For example, networking subsystem 914 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 914 includes processors, controllers, radios/antennas, sockets/plugs, and/or other devices used for coupling to, communicating on, and handling data and events for each supported networking system. In the preceding discussion, the mechanisms used for coupling to, communicating on, and handling data and events on the network for each network system were sometimes collectively referred to as a 'network interface' for the network system. Note that in some embodiments, a 'network' between the electronic devices does not yet exist. Therefore, electronic device 900 may use the mechanisms in networking subsystem 914 for performing simple wireless communication between the electronic devices, e.g., transmitting advertising frames and/or scanning for advertising frames transmitted by other electronic devices as described previously.

Within electronic device 900, processing subsystem 910, memory subsystem 912, and networking subsystem 914 are coupled together using bus 922. Bus 922 may include an electrical, optical, and/or electro-optical connection that the subsystems can use to communicate commands and data among one another. Although only one bus 922 is shown for clarity, different embodiments can include a different number or configuration of electrical, optical, and/or electro-optical connections between the subsystems.

Electronic device 900 can be (or can be included in) any electronic device with at least one network interface. For example, electronic device 900 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 900, in alternative embodiments, different components and/or subsystems may be present in electronic device 900. For example, electronic device 900 may include one or more additional processing subsystems 910, memory subsystems 912, and/or networking subsystems 914. Additionally, one or more of the subsystems may not be present in electronic device 900. Moreover, in some embodiments, electronic device 900 may include one or more additional subsystems that are not shown in FIG. 9. For example, electronic device 900 can include, but is not limited to, a display subsystem for displaying information on a display, a data collection subsystem, an audio and/or video subsystem, an alarm subsystem, a media processing subsystem, and/or an input/output (I/O) subsystem. Also, although separate subsystems are shown in FIG. 9, in some embodiments, some or all of a given subsystem can be integrated into one or more of the other subsystems in electronic device 900.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

One or more circuits in portable electronic device 900 may be implemented on an integrated circuit. This is shown in FIG. 10, which presents a block diagram illustrating an integrated circuit 1000, which includes control logic 916 and interface circuit 918.

Integrated circuit 1000 may implement some or all of the functionality of networking subsystem 914, such as a radio. Moreover, integrated circuit 1000 may include hardware and/or software mechanisms that are used for transmitting wireless signals from electronic device 900 (FIG. 9) and receiving signals at electronic device 900 from other electronic devices (FIG. 9). Aside from the mechanisms herein described, radios are generally known in the art and hence are not described in detail. In general, networking subsystem 914 (FIG. 9) and/or integrated circuit 1000 can include any number of radios. Note that the radios in multiple-radio embodiments function in a similar way to the described single-radio embodiments.

In some embodiments, networking subsystem 914 (FIG. 9) and/or integrated circuit 1000 include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While Bluetooth™ was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit; and
control logic coupled to the interface circuit,
wherein the control logic and the interface circuit are configured to:
monitor for an advertising frame from another electronic device during a scan window; and
receive, at the interface circuit, an advertising frame comprising an advertised address from the another electronic device during a scan window;
in response to the advertising frame being received from the another electronic device before the scan window has expired:
terminate the monitoring before the scan window has expired; and
use the interface circuit to transmit a connect request to the another electronic device; and
in response to determining that the electronic device has an existing connection with the another device based on at least an existing address, continue to use the connection with the advertised address.

2. The electronic device of claim 1, wherein the advertised address comprises an encoded address, and wherein the control logic is further configured to determine an actual address of the another electronic device using the encoded address.

3. The electronic device of claim 2, wherein the encoded address comprises a pseudo-randomly generated encoded address.

4. The electronic device of claim 1, wherein the interface circuit is configured to use the connection based at least in part on a Bluetooth standard.

5. The electronic device of claim 1, wherein the advertising frame comprises a connect request from the another electronic device.

6. The electronic device of claim 1, wherein to determine connection with the another electronic device exists based at least in part on the existing address, the control logic is further configured to:
determine that a first media access control (MAC) address corresponding to the advertised address and a second MAC address corresponding to the existing address are the same.

7. The electronic device of claim 1, wherein the control logic is further configured to:
determine an application attempted to establish a connection with the another electronic device based at least in part on the existing address; and
notify the application that the connection is established at the advertised address.

8. The electronic device of claim 1 wherein the control logic is further configured to:
store information in a memory that relates the existing address to the advertised address.

9. An integrated circuit, comprising:
an interface circuit comprising a radio; and
control logic;
wherein the control logic and the interface circuit are configured to:
monitor for an advertising frame from another electronic device during a scan window; and
receive, at the interface circuit from the radio, an advertising frame comprising an advertised address from the another electronic device during a scan window;
in response to the advertising frame being received from the another electronic device before the scan window has expired,
terminate the monitoring before the scan window has expired; and
use the radio to transmit a connect request to the another electronic device; and
in response to determining that the electronic device has an existing connection with the another device based on at least an existing address, continue to use the connection with the advertised address.

10. The integrated circuit of claim 9, wherein the advertised address comprises an encoded address, and wherein the control logic is further configured to determine an actual address of the another electronic device based at least in part on the encoded address.

11. The integrated circuit of claim 10, wherein the encoded address comprises a pseudo-randomly generated encoded address.

12. The integrated circuit of claim 9, wherein the interface circuit is configured to use the connection based at least in part on a Bluetooth standard.

13. The integrated circuit of claim 9, wherein the advertising frame comprises a connect request from the another electronic device.

14. The integrated circuit of claim 9, wherein to determine connection with the another electronic device exists based at least in part on the existing address, the control logic is further configured to:

determine that a first media access control (MAC) address corresponding to the advertised address and a second MAC address corresponding to the existing address are the same.

15. The integrated circuit of claim 9, wherein the control logic is further configured to:
  determine an application attempted to establish a connection with the another electronic device based at least in part on the existing address; and
  notify the application that the connection is established at the advertised address.

16. A method for operating an electronic device that comprises control logic and an interface circuit, the method comprising:
  by the control logic and the interface circuit, performing operations for:
  monitoring for an advertising frame from another electronic device during a scan window; and
  receiving, at the interface circuit, an advertising frame comprising an advertised address from the another electronic device during a scan; and
  in response to the advertising frame being received from the another electronic device before the scan window has expired:
    terminating the monitoring before the scan window has expired; and
    using the interface circuit to transmit a connect request to the another electronic device; and
  in response to determining that the electronic device has an existing connection with the another device based on at least an existing address, continuing to use the connection with the advertised address.

17. The method of claim 16, wherein the advertised address comprises an encoded address, and wherein the method further comprises determining an actual address of the another electronic device based at least in part on the encoded address.

18. The method of claim 17, wherein the encoded address comprises a pseudo-randomly generated encoded address.

19. The method of claim 16, wherein the using the connection is performed based at least in part on a Bluetooth standard.

20. The method of claim 16, wherein the advertising frame comprises a connect request from the another electronic device.

* * * * *